US009174182B2

(12) United States Patent
Wimberger-Friedl et al.

(10) Patent No.: US 9,174,182 B2
(45) Date of Patent: Nov. 3, 2015

(54) MIXER WITH ZERO DEAD VOLUME AND METHOD FOR MIXING

(75) Inventors: Reinhold Wimberger-Friedl, Eindhoven (NL); Ronald Cornelis De Gier, Eindhoven (NL); Peter Hermanus Bouma, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 743 days.

(21) Appl. No.: 13/265,569

(22) PCT Filed: Apr. 16, 2010

(86) PCT No.: PCT/IB2010/051671
§ 371 (c)(1),
(2), (4) Date: Oct. 21, 2011

(87) PCT Pub. No.: WO2010/122464
PCT Pub. Date: Oct. 28, 2010

(65) Prior Publication Data

US 2012/0100630 A1 Apr. 26, 2012

(30) Foreign Application Priority Data

Apr. 23, 2009 (EP) ..................................... 09158646

(51) Int. Cl.

| | |
|---|---|
| ***G01N 1/10*** | (2006.01) |
| ***G01N 1/02*** | (2006.01) |
| ***G01N 1/00*** | (2006.01) |
| ***B01F 5/06*** | (2006.01) |
| ***B01F 13/00*** | (2006.01) |
| ***B01F 11/00*** | (2006.01) |

(52) U.S. Cl.
CPC ........... *B01F 13/0059* (2013.01); *B01F 5/0683* (2013.01); *B01F 5/0688* (2013.01); *B01F 11/0071* (2013.01); *Y10T 436/25* (2015.01); *Y10T 436/2575* (2015.01)

(58) Field of Classification Search
CPC ............ Y10T 436/2575; Y10T 436/25; Y10T 436/00; G01N 1/10; G01N 1/02; G01N 1/00; B01F 5/0683; B01F 5/0687; B01F 5/0688; B01F 5/0682; B01F 5/06; B01F 5/00; B01F 11/0071; B01F 11/00; B01F 13/0059; B01F 13/00
USPC ............. 436/180, 174; 422/502, 501, 500, 50
See application file for complete search history.

(56) References Cited

U.S. PATENT DOCUMENTS

| | | | |
|---|---|---|---|
| 3,932,220 | A | 1/1976 | Liotta |
| 5,356,814 | A | 10/1994 | Carrico |
| 5,595,712 | A | 1/1997 | Harbster et al. |
| 6,180,314 | B1 | 1/2001 | Berndt |
| 6,239,906 | B1 | 5/2001 | Lorincz |
| 6,468,807 | B1 | 10/2002 | Svensson |
| 6,591,852 | B1 | 7/2003 | McNeely |
| 6,660,527 | B2 | 12/2003 | Stroup |
| 6,890,093 | B2 | 5/2005 | Karp |
| 7,258,774 | B2 | 8/2007 | Chou |
| 2003/0064507 | A1 | 4/2003 | Gallagher |
| 2004/0159616 | A1 | 8/2004 | Cohee |
| 2005/0019898 | A1 | 1/2005 | Adey |
| 2006/0115381 | A1 | 6/2006 | Kuno |
| 2007/0053796 | A1 | 3/2007 | Gau |

FOREIGN PATENT DOCUMENTS

| | | | |
|---|---|---|---|
| WO | 0149413 | A1 | 7/2001 |
| WO | 0241994 | A2 | 5/2002 |
| WO | 2006136999 | A1 | 12/2006 |

*Primary Examiner* — Christine T Mui

(57) ABSTRACT

A micro fluidics system includes a closed, expandable volume for mixing a fluid, and a flexible membrane for allowing mixing in the closed, expandable volume. The system further includes a surface having at least one channel for fluidically coupling a first side of the surface to the closed, expandable volume on a second side of the surface. The channel includes a first channel opening fluidically coupling the first side of the surface to the channel and a second channel opening fluidically coupling the channel to the closed, expandable volume. The expandable volume is defined by the flexible membrane closing the second channel opening when there is no fluid in the expandable volume.

12 Claims, 2 Drawing Sheets

MIXER WITH ZERO DEAD VOLUME AND METHOD FOR MIXING

FIELD OF THE INVENTION

The invention relates to a microfluidics system comprising:

a closed, expandable volume for mixing a fluid;

a flexible membrane for allowing mixing in the closed, expandable volume.

The invention further relates to a device comprising such a micro fluidics system.

The invention further relates to a method for using such a microfluidics the system.

BACKGROUND OF THE INVENTION

An embodiment of a microfluidics system as referred to above is known from US 2005/0019898 A1. This document describes a fluid mixing device comprising a chamber comprising two diaphragm regions. The diaphragm regions are displaced into and out of the chamber by inflation and deflation of two mixing bladders to generate fluid movement within the chamber. Mixing results from the fluid movement obtained by operating the mixing bladders and diaphragm regions. It is a drawback of the known device that the mixing can be improved and that the mixing bladders and associated means for inflating and deflating the mixing bladders take-up volume. The fluid cannot be removed from the mixing chamber except by replacing with another fluid (air) which requires another fluid source and additional sealing measures.

SUMMARY OF THE INVENTION

It is an object of the invention to provide a microfluidics system that has improved mixing characteristics.

The invention is based on the recognition that by having a channel through which one or more fluids enter a closed, expandable volume closed by a flexible membrane, a chaotic flow pattern is created near the membrane inside the expandable volume when fluids to be mixed are transported through the channel into the expandable volume. The chaotic flow pattern leads to an efficient mixing of the fluid entering the expandable volume. The invention enables homogenizing a single fluid entering the closed, expandable volume or mixing two or more different fluids. For the current invention homogenizing and mixing are regarded as a single concept indicated by the term mixing. In a preferred embodiment the tension occurring in the flexible membrane as a result of the expansion of the membrane as the expandable volume fills with fluid tends to push the fluid back towards the channel through which the fluid entered the expandable volume. No external actuation is required for this tendency to push back the fluid. However, external actuation may be applied with or without a flexible membrane. The filling and emptying of the expandable volume can be repeated as often as required for a certain quality of mixing, the degree of filling can be varied as desired so the same design can be used for different volumes, depending on the application.

Consequently, the micro fluidics system according to the invention provides improved mixing as compared to the mixing obtained in the prior art described above. Moreover, the present invention does not require a reservoir, venting of gas which is displaced by moving fluid, or an extra volume. By making the closed volume expandable no extra volume is required and all fluid can be recovered into the system without venting or using a displacing fluid.

It is an additional advantage of the invention that the device according to the invention is compact. When there is no fluid in the closed, expandable volume, the dead volume is essentially zero.

An embodiment of the microfluidics system according to the invention is characterized in that the flexible membrane covers the second channel opening.

This embodiment has the advantage that the expandable volume is completely defined by the flexible membrane allowing simple and easy assembly of a microfluidics system according to the invention. Alternatively, the flexible membrane may be located in the channel at the second channel opening.

A further embodiment of the microfluidics system according to the invention is characterized in that the flexible membrane is elastic.

This embodiment has the advantage that the membrane upon expansion generates a force tending to push liquid out of the expandable volume. This means that no separate actuation of the fluid is absolutely necessary to remove fluid from the expandable volume after (a single cycle of) mixing.

A further embodiment of the microfluidics system according to the invention is characterized in that the microfluidics system comprises a plurality of channels to the closed, expandable volume. This embodiment has the advantage that it allows chaotic flow patterns different from those attainable by use of a single channel.

A further embodiment of the microfluidics system according to the invention is characterized in that at least one of the channels out of the plurality of channels comprises a directional valve.

This embodiment has the advantage that providing at least one but not all channels out of a plurality of channels fluidically coupling the first side of the surface to the closed, expandable volume with a directional valve allows enhancement of mixing by forcing fluid out of the expandable volume along a path different from the path along which the fluid entered the expandable volume.

A further embodiment of the microfluidics system according to the invention is characterized in that the geometry of the channel is adapted for enhancing mixing.

This embodiment has the advantage that it allows enhancement of mixing. A well-known structure for enhancing mixing is a so-called herring bone structure which leads to a rotation of the flow field dependent on the flow direction.

A further embodiment of the microfluidics system according to the invention is characterized in that the closed, expandable volume comprises a structure for enhancing mixing.

This embodiment has the advantage that it allows enhancement of mixing. A possibility that can be optionally combined with a structure such as a herring bone structure (see the previous embodiment), is formed by one or more grooves over the bottom of the chamber which act as extended openings of the channel.

A further embodiment of the microfluidics system according to the invention is characterized in that the flexible membrane is pre-shaped for enhancing mixing.

This embodiment has the advantage that it allows enhancement of mixing. One embodiment of a pre-shaped a flexible membrane is a membrane pre-shaped like a folded bag also called a faltenbalg. Moreover, the membrane may be pre-shaped in the sense that it is nonsymmetric with respect to the opening or openings of the channel or channels communicating fluid to the closed, expandable volume.

The object of the invention is further realized with a device comprising a microfluidics system according to any one of the previous embodiments.

A device comprising a micro fluidics system according to the invention would benefit from any one of the previous embodiments.

An embodiment of a device according to the invention is characterized in that the device is a cartridge, the cartridge being insertable into an instrument for into acting with the cartridge.

This embodiment has the advantage that cartridges, for instance there was used in molecular diagnostics, sometimes require mixing of fluids. Consequently, a cartridge comprising a microfluidics system according to the invention would benefit from any one of the previous embodiments of the invention.

A further embodiment of a device according to the invention is characterized in that the device is a device for molecular diagnostics.

This embodiment has the advantage that a device for molecular diagnostics may require mixing of fluids. Consequently, such a device, potentially comprising a cartridge according to the previous embodiment, would benefit from any one of the previous embodiment of the invention.

The object of the invention is further realized with a method for mixing fluids comprising the following steps:

providing a micro fluidics system comprising:

a surface comprising at least one channel for fluidically coupling a first side of the surface to a closed, expandable volume on a second side of the surface, the channel comprising a first channel opening fluidically coupling the first side of the surface to the channel and a second channel opening fluidically coupling the channel to the closed, expandable volume, the expendable volume being defined by a flexible membrane closing the second channel opening when there is no fluid in the expendable volume;

transporting fluid from the first side of the surface to the closed, expandable volume thereby expanding the closed, expandable volume;

returning transported fluid from the closed, expandable volume to the first side of the surface thereby returning the close, expandable volume to its original volume.

An embodiment of a method according to the invention is characterized in that the steps of transporting and returning are repeated as often as necessary to achieve a desired level of mixing.

This embodiment has the advantage that mixing can be repeated by going through a plurality of mixing cycles until a desired level of mixing has been achieved.

DETAILED DESCRIPTION OF EMBODIMENTS

Figure 1A:
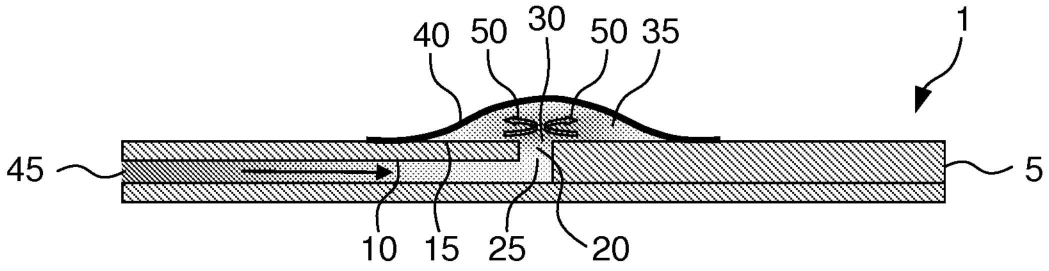
FIG. 1 schematically shows a microfluidics system according to the invention.

FIG. 1 schematically shows a microfluidics system according to the invention. FIG. 1*a* schematically shows a side view of a microfluidics system 1 according to the invention. The microfluidics system 1 comprises a surface 5, the surface 5 comprising a first side 10 and a second side 15. The surface 5 further comprises a channel 20. The channel 20 comprises a first channel opening 25 fluidically coupling the first side 10 of the surface 5 to the channel 20. The channel 20 further comprises a second channel opening 30 fluidically coupling the channel 20 to the closed, expandable volume 35. Membrane 40 covers the second channel opening 30 and defines the expandable volume 35. Alternatively, a membrane capable of expanding like a balloon and positioned at or in the second channel opening 30 (not shown) would be suitable to create chaotic flow. The micro fluidics system 1 still further comprises a channel 45 for transporting fluid to be mixed towards the channel 20 and the closed, expandable volume 35. FIG. 1 shows the microfluidics system 1 at a moment at which fluid is transported through the channel 45 and channel 20 towards the closed, expandable volume 35. After entering the closed, expandable volume 35 fluid flows in a chaotic flow pattern. This is the result of passage through the channel 20 and the influence of the membrane 40 forcing the fluid to spread out over the volume occupied by the expandable volume 35. The chaotic flow pattern is indicated by the arrows 50. The chaotic flow pattern is introduced by the elongational flow field in the transition from the channel to the virtually infinite chamber. An expandable volume that expands in a direction perpendicular to the main flow direction in the channel while at the same time the main flow direction is changed once a fluid exits the channel and enters the expandable volume is suitable for creating a chaotic flow pattern. This is especially true if the opening of the channel into the expandable volume is not placed in the axis of symmetry of the expandable volume. A membrane having a diameter about 10 times the diameter of the channel would be suitable for creating chaotic flow, especially if the height of the expandable volume in the expanded state is five to 10 times higher than the channel height. As goes for all embodiments of the present invention, one or more channels 20 fluidically coupling the first side 10 to the expandable volume 35 may be adapted to enhance mixing. A channel 20 may, for instance, comprise one or more protrusions (not shown). Fluid flowing through the channel has to move along the protrusions as a result of which mixing is enhanced as compared to the basic embodiment of the present invention shown in FIG. 1*a*. Another option is to have structures inside the closed, expandable chamber on the surface facing the flexible membrane. Such structures influence fluid flow and hence mixing. Such structures may be used to create asymmetry with respect to the expansion of the flexible membrane. Moreover, structure is like herring bone structure it may be used as well. The abovementioned options may also be used in any combination.

Figure 1B:
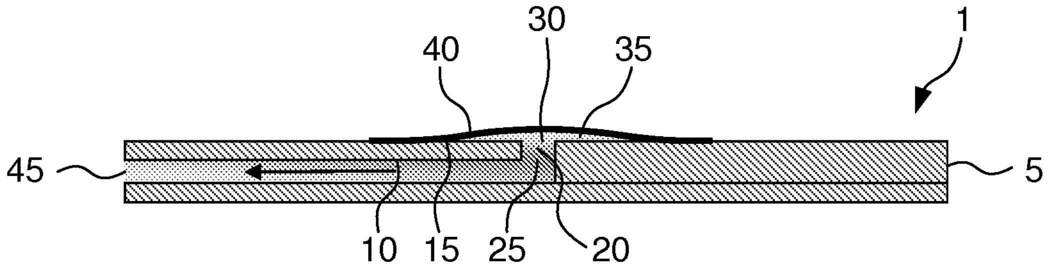

FIG. 1*b* shows the same setup as FIG. 1*a*. However, in the present figure the microfluidics system 1 is shown at a moment at which fluid flows from the closed, expandable volume 35 through the channel 20 and the channel 45. As fluid flows from the expandable volume 35, the size of the volume is reduced. In the figure this is illustrated by the fact that the membrane 40 is now virtually directly over the second channel opening 30. This illustrates that, when there is no fluid in the closed, expandable volume 35, the space taken up by the volume 35 is essentially zero. Consequently, a mixing device according to the present invention has a virtually zero dead volume. Hence, the device is compact. Moreover, the microfluidics system 1 according to the invention does not require expensive materials or actuation means. As a result, a microfluidics system 1 according to the invention can be produced cheaply.

Figure 1C:
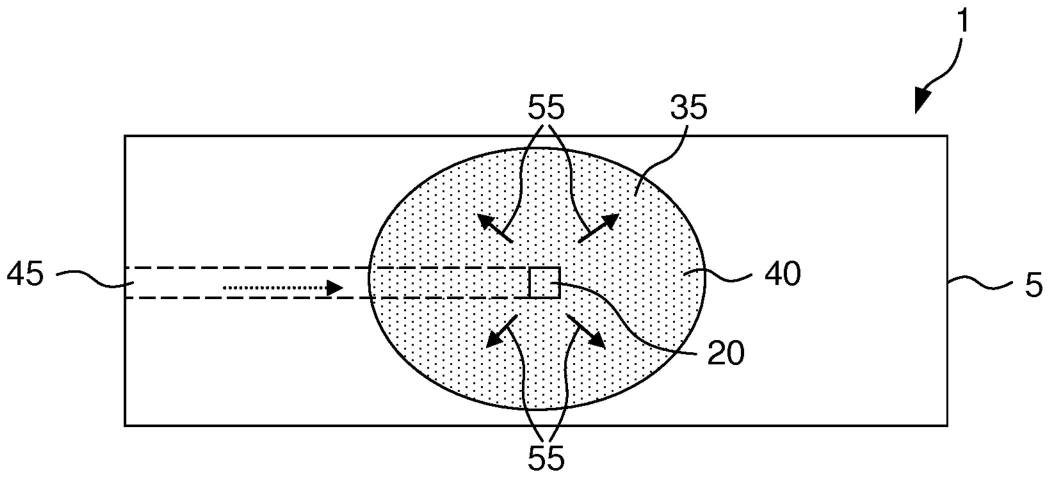

FIG. 1*c* shows a top view of the setup shown in FIG. 1*a*. Fluid to be mixed is transported through channel 45 and channel 20 towards the closed, expandable volume 35. Under the influence of the fluid inside the expandable volume 35 the membrane 40 expands as indicated by the arrows 55. The mechanical properties of the membrane 40 can be varied depending on requirements from elastomeric to visco-elastic. In a non-elastomeric design, expansion of the membrane 40 under the influence of fluid entering the expandable volume 35 does not result in a resultant force of the membrane 40 on the fluid pushing the fluid back towards the channel 20. In that case, separate actuation of the fluid is needed to remove fluid from the expandable volume 35. However, if the membrane 40 is elastic, expansion of the membrane 40 will result in a resultant force of the membrane 40 on the fluid pushing the fluid back towards the channel 20. In that case, no separate actuation is absolutely necessary in order to remove fluid from the expandable volume 35.

Figure 2:
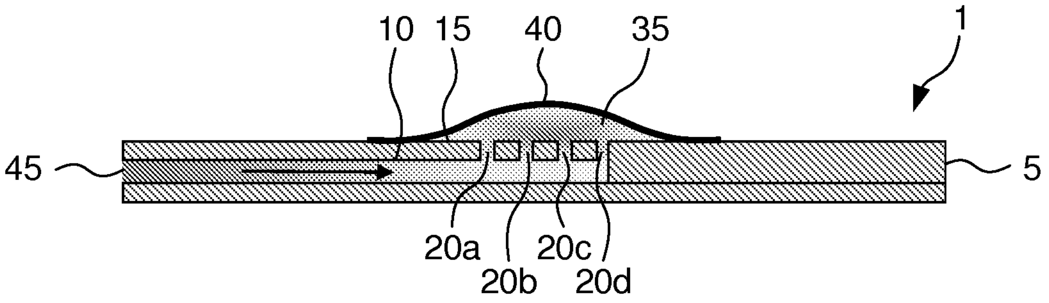
FIG. 2 schematically shows a microfluidics system according to the invention comprising a plurality of channels.

FIG. 2 schematically shows a microfluidics system according to the invention comprising a plurality of channels. Most elements in the present figure are identical to elements shown in FIG. 1. Identical elements have been given identical reference numbers. However, in the present figure the micro fluidics system 1 according to the invention comprises a plurality of channels 20*a-d* fluidically coupling the first side 10 of the surface 5 to the closed, expandable volume 35. Having a plurality of channels enhances the mixing effect. Different channels 20*a*-20*d* can optionally be connected to different supply channels (like the channel 45 in the present figure) allowing mixing of fluids coming from different sources (not shown in the present figure). In that case, one or more channels like the channel 45 in the present figure would be present in a device according to the invention with one or more of those channels being coupled to one or more channels coupled to the expandable volume like the channels 20*a*-20*d* in the present figure. In other words, a single supply channel may be connected to a plurality of channels communicating fluid to the closed, expandable volume (not shown). In that case, a single supply channel branches out into a plurality of channels fluidically coupled to the closed, expandable volume. A plurality of such supply channels may be present. In short one option is to have the 'shower head' configuration of the present figure in which a single supply channel 45 branches out into a number of channels 20*a*-20*d* that are coupled to the expandable volume 35. Another option is to have multiple supply channels 45. One or more of those multiple supply channels 45 may branch out into a plurality of channels 20*a*-20*d*.

Figure 3:
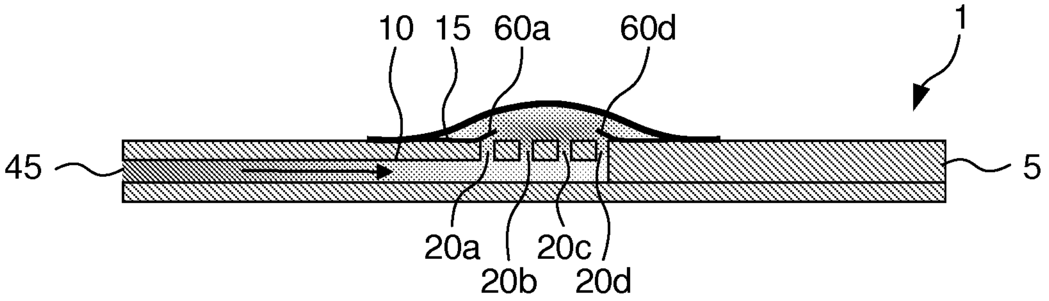
FIG. 3 schematically shows a microfluidics system according to the invention comprising a directional valve.

FIG. 3 schematically shows a microfluidics system according to the invention comprising a directional valve. Most elements in the present figure are identical to elements shown in FIG. 2. Identical elements have been given identical reference numbers. However, in the present figure channel 20*a* and channel 20*d* each comprise a directional valve. Channel 20*a* comprises directional valve 60*a* and channel 20*d* comprises directional valve 60*d*. In the present embodiment, the directional valves have been designed as flexible members (flaps) that open when fluid flows into the expandable volume and that close when fluid flows in the opposite direction. Another example of a directional valve is formed by a ball in a cavity which allows fluid to pass in one direction and closes when the fluid pressure is in the opposite direction. These and further examples of directional valves will be known to the skilled person. As a result of the directional valves 60*a* and 60*d* fluid can enter the expandable volume 35 through channel 20*a* and channel 20*d*. However, fluid cannot leave the expandable volume 35 through the same channels. By using one or more channels 20 (see also FIG. 1 and FIG. 2) and/or by using directional valves in one or more but not all channels 20 (see the present figure) different flow patterns can be achieved each of which has its own mixing characteristics. Depending on the mixing requirements of a certain application, the desirability or affordability of a plurality of channels 20 or directional valves 60, a suitable design can be chosen.

Figure 4:
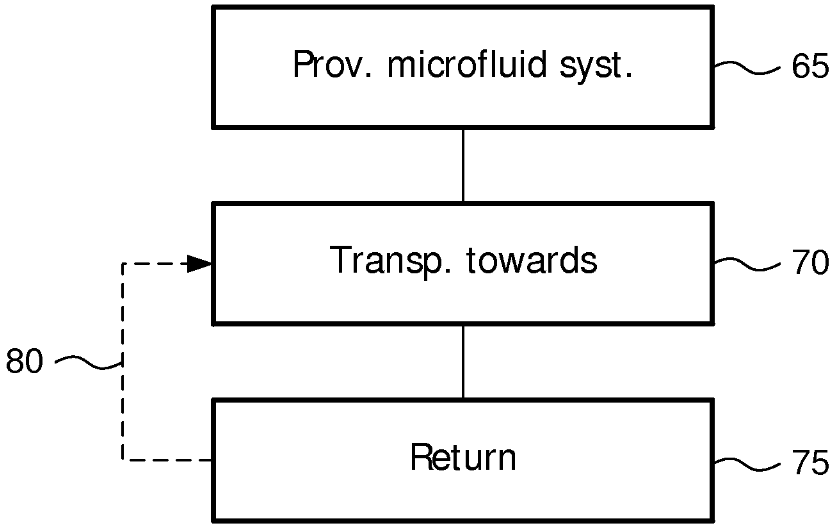
FIG. 4 schematically shows an embodiment of a method according to the invention.

FIG. 4 schematically shows an embodiment of a method according to the invention. In step 65 a microfluidics system according to any one of the embodiments of the present invention is provided. Next, in step 70, fluid to be mixed is transported towards and into a closed, expandable volume. Under the influence of fluid entering the expandable volume, the expandable volume expands. As the fluid and has the expandable volume through a channel and because of the presence of a flexible membrane defining the expandable volume, a chaotic flow pattern is setup inside the expandable volume resulting in mixing of the fluid. Under the influence of a resultant force resulting from elastic characteristics of the flexible membrane or under the influence of separate actuation, fluid is then returned from the expandable volume. This is done in step 75. According to an embodiment of the method according to this invention, step 70 and step 75 can be repeated as often as necessary to obtain a required level of mixing. In the present figure this has been indicated by the dashed arrow 80.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the system claims enumerating several means, several of these means can be embodied by one and the same item of computer readable software or hardware. The mere fact that certain measures are recited in mutually different dependent claims does not indicate that a combination of these measures cannot be used to advantage.

The invention claimed is:

1. A microfluidics system comprising:

a closed, expandable volume for mixing a fluid;

a flexible membrane for allowing mixing in the closed, expandable volume;

a directional valve; and a surface comprising a plurality of channels for fluidically coupling a first side of the surface to the closed, expandable volume on a second side of the surface, wherein a first channel of the plurality of channels comprises a first channel opening fluidically coupling the first side of the surface to the first channel and a second channel opening fluidically coupling the first channel to the closed, expandable volume, the expandable volume being defined by the flexible membrane closing the second channel opening when there is no fluid in the expandable volume, wherein the directional valve is configured to allow passage of the fluid in only one direction by allowing the fluid to enter the closed, expandable volume through the first channel and preventing exit of the fluid from the closed, expandable volume through the first channel.

2. The microfluidics system as claimed in claim 1, wherein the flexible membrane covers the second channel opening.

3. The microfluidics system as claimed in claim 1, wherein the flexible membrane is elastic.

4. The microfluidics system as claimed in claim 1, wherein the geometry of the channel is adapted for enhancing mixing.

5. The microfluidics system as claimed in claim 1, wherein the dosed, expandable volume comprises a structure for enhancing mixing.

6. The microfluidics system as claimed in claim 1, wherein the flexible membrane is pre-shaped for enhancing mixing.

7. A device comprising a microfluidics system according to claim 1.

8. The device as claimed in claim 7, wherein the device is a cartridge, the cartridge being insertable into an instrument for into acting with the cartridge.

9. A method for mixing fluids comprising the following acts:

providing a microfluidics system comprising:

a surface comprising a plurality of channels for fluidically coupling a first side of the surface to a dosed, expandable volume on a second side of the surface, wherein a first channel of the plurality of channels comprises a first channel opening fluidically coupling the first side of the surface to the first channel and a second channel opening fluidically coupling the first channel to the dosed, expandable volume, the expandable volume being defined by a flexible membrane closing the second channel opening when there is no fluid in the expandable volume;

transporting fluid from the first side of the surface to the closed, expandable volume through a directional valve thereby expanding the closed, expandable volume, wherein the directional valve is configured to allow passage of the fluid in only one direction by allowing the fluid to enter the dosed, expandable volume through the first channel and preventing exit of the fluid from the dosed, expandable volume through the first channel;

returning the transported fluid from the dosed, expandable volume to the first side of the surface through a second channel of the plurality of channels thereby returning the close, expandable volume to its original volume.

10. The method as claimed in claim 9, wherein the acts of transporting and returning are repeated as often as necessary to achieve a desired level of mixing.

11. The device of claim 1, wherein the directional valve is located at the second channel opening.

12. The method of claim 9, wherein the directional valve is located at the second channel opening.

* * * * *